United States Patent
Ahn et al.

(10) Patent No.: US 9,025,259 B2
(45) Date of Patent: May 5, 2015

(54) PHOTOGRAPHIC LENS OPTICAL SYSTEM

(71) Applicant: Kolen Co., Ltd., Gyeonggi-do (KR)

(72) Inventors: Chi Ho Ahn, Seongnam-si (KR); Jae-Hoon Cho, Seongnam-si (KR); Ji Eun Kim, Seongnam-si (KR); Chan Goo Kang, Daejeon (KR); Se Jin Kim, Seoul (KR)

(73) Assignee: Kolen Co., Ltd. (KR)

( * ) Notice: Subject to any disclaimer, the term of this patent is extended or adjusted under 35 U.S.C. 154(b) by 0 days.

(21) Appl. No.: 14/144,787

(22) Filed: Dec. 31, 2013

(65) Prior Publication Data

US 2014/0184880 A1    Jul. 3, 2014

(30) Foreign Application Priority Data

Dec. 31, 2012  (KR) .......................... 10-2012-0158539

(51) Int. Cl.
*G02B 9/34*       (2006.01)
*G02B 13/00*      (2006.01)
*G02B 5/20*       (2006.01)

(52) U.S. Cl.
CPC .............. *G02B 13/004* (2013.01); *G02B 5/208* (2013.01)

(58) Field of Classification Search
USPC ................................................. 359/715, 780
See application file for complete search history.

(56) References Cited

U.S. PATENT DOCUMENTS

| | | | |
|---|---|---|---|
| 2012/0154905 A1* | 6/2012 | Tsai | 359/357 |
| 2012/0224273 A1 | 9/2012 | Tsai et al. | |
| 2012/0236421 A1 | 9/2012 | Tsai et al. | |
| 2013/0308209 A1* | 11/2013 | Baba | 359/780 |

OTHER PUBLICATIONS

Korean Intellectual Property Office Notice of Non-Final Rejection Application No. 10-2012-0158539 Issued: Dec. 24, 2013 9 pages.

* cited by examiner

*Primary Examiner* — James Jones
(74) *Attorney, Agent, or Firm* — St. Onge Steward Johnston & Reens LLC (57) ABSTRACT

First, second, third, and fourth lenses (in order from an object side) are arranged between the object and an image sensor where an image of the object is formed. The first lens may have a positive refractive power and may be a meniscus lens that is convex toward the object. The second lens may have a positive refractive power and may be a meniscus lens that is convex toward the image sensor. The third lens may have a positive refractive power and may be a meniscus lens that is convex toward the image sensor. At least one of an incident surface and an exit surface of the fourth lens may be an aspherical surface. The fourth lens may have a negative refractive power or a positive refractive power. A viewing angle θ of the lens optical system may satisfy a conditional expression, $2.5<|\tan\theta|<3.5$.

18 Claims, 6 Drawing Sheets

PHOTOGRAPHIC LENS OPTICAL SYSTEM

FIELD OF THE INVENTION

The present invention relates to a lens optical system adopted in a camera, and more particularly, to a lens optical system adopted in an iris recognition camera.

BACKGROUND OF THE INVENTION

Cameras using a solid state image sensor such as a charge coupled device (CCD) and a complementary metal oxide semiconductor (CMOS) image sensor have been rapidly distributed. To increase resolution of a camera, a degree of pixel integration of a solid state image sensor is increased. Also, the size and weight of a camera is being reduced through improvement of performance of a lens optical system included in a camera.

In a general lens optical system of a camera, a large number of lenses are used to secure performance of the lens optical system, e.g., to secure a large angle of view and to correct aberration. However, when the lens optical system includes many lenses, it may be difficult to make a compact and lightweight camera. There is a demand to develop a compact lens optical system having a relatively wide angle of view and being able to easily correct aberration.

Recently, as iris recognition technology has drawn attention as the next generation technology for authentication and security, there is a demand to develop a lens optical system for an iris recognition camera. In other words, there is a demand to improve performance of an iris recognition lens optical system and to secure a wide viewing angle thereof.

SUMMARY OF THE INVENTION

The present invention provides a lens optical system (e.g., an iris recognition lens optical system) that is compact and lightweight and exhibits a relatively wide viewing angle and superior performance.

According to an aspect of the present invention, there is provided a lens optical system including first, second, third, and fourth lenses that are arranged between an object and an image sensor where an image of the object is formed, in order from an object side, wherein the first lens has a positive (+) refractive power and a meniscus shape that is convex toward the object, the second lens has a positive (+) refractive power and a meniscus shape that is convex toward the image sensor, the third lens has a positive (+) refractive power and a meniscus shape that is convex toward the image sensor, and at least one of an incident surface and an exit surface of the fourth lens is an aspherical surface.

The lens optical system may satisfy at least one of the following conditional expressions 1 to 3.

$$2.5 < |\tan \theta| < 3.5, \quad \text{<Conditional expression 1>:}$$

wherein θ is a viewing angle of the lens optical system.

$$1.0 < f/D4 < 1.5, \quad \text{<Conditional expression 2>:}$$

wherein f is a focal length of the lens optical system, and D4 is an effective radius of the exit surface of the fourth lens.

$$1.5 < TTL/f < 2.5, \quad \text{<Conditional expression 3>:}$$

wherein TTL is a distance from an incident surface of the first lens to the image sensor, and f is a focal length of the lens optical system.

The fourth lens may have a negative (−) refractive power.
The fourth lens may have a positive (+) refractive power.
At least one of the first to third lenses may be an aspherical lens.

At least one of an incident surface and an exit surface of at least one of the first to third lenses may be an aspherical surface.

At least one of an incident surface and an exit surface of the fourth lens may have at least one inflection point between a center portion and an edge thereof.

The incident surface of the fourth lens may be convex toward the object at the center portion and concave toward the object around the center portion.

The exit surface of the fourth lens may be concave toward the image sensor at the center portion and convex toward the image sensor around the center portion.

The second, third, and fourth lenses may be aberration correction lenses.

The lens optical system may include an aperture diaphragm between the object and the image sensor.

The aperture diaphragm may be arranged between the first lens and the second lens.

The lens optical system may further include a bandpass filter between the object and the image sensor.

The bandpass filter may be arranged between the fourth lens and the image sensor.

The bandpass filter may be an IR pass filter.

At least one of the first to fourth lenses may be a plastic lens.

The viewing angle θ of the lens optical system may be about 70° or greater.

The lens optical system may be an iris recognition lens optical system.

According to an aspect of the present invention, there is provided a lens optical system including first, second, third, and fourth lenses that are arranged between an object and an image sensor where an image of the object is formed, in order from an object side, wherein all of the first, second, and third lenses have positive (+) refractive powers, and wherein the lens optical system satisfies at least one of the following conditional expressions, $$2.5 < |\tan \theta| < 3.5, \quad \text{<Conditional expression 1>: and}$$

$$1.0 < f/D4 < 1.5, \quad \text{<Conditional expression 2>:}$$

wherein θ is a viewing angle of the lens optical system, f is a focal length of the lens optical system, and D4 is an effective radius of an exit surface of the fourth lens.

The lens optical system may further satisfy the following conditional expression.

$$1.5 < TTL/f < 2.5, \quad \text{<Conditional expression 3>:}$$

wherein TTL is a distance from an incident surface of the first lens to the image sensor and f is a focal length of the lens optical system.

The fourth lens may have a negative (−) refractive power.
The fourth lens may have a positive (+) refractive power.
The first lens may be a meniscus lens that is convex toward the object.

The second lens may be a meniscus lens that is convex toward the image sensor.

The third lens may be a meniscus lens that is convex toward the image sensor.

The fourth lens may be an aspherical lens. At least one of the incident surface and the exit surface of the fourth lens may have at least one inflection point between a center portion and an edge thereof.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 1:
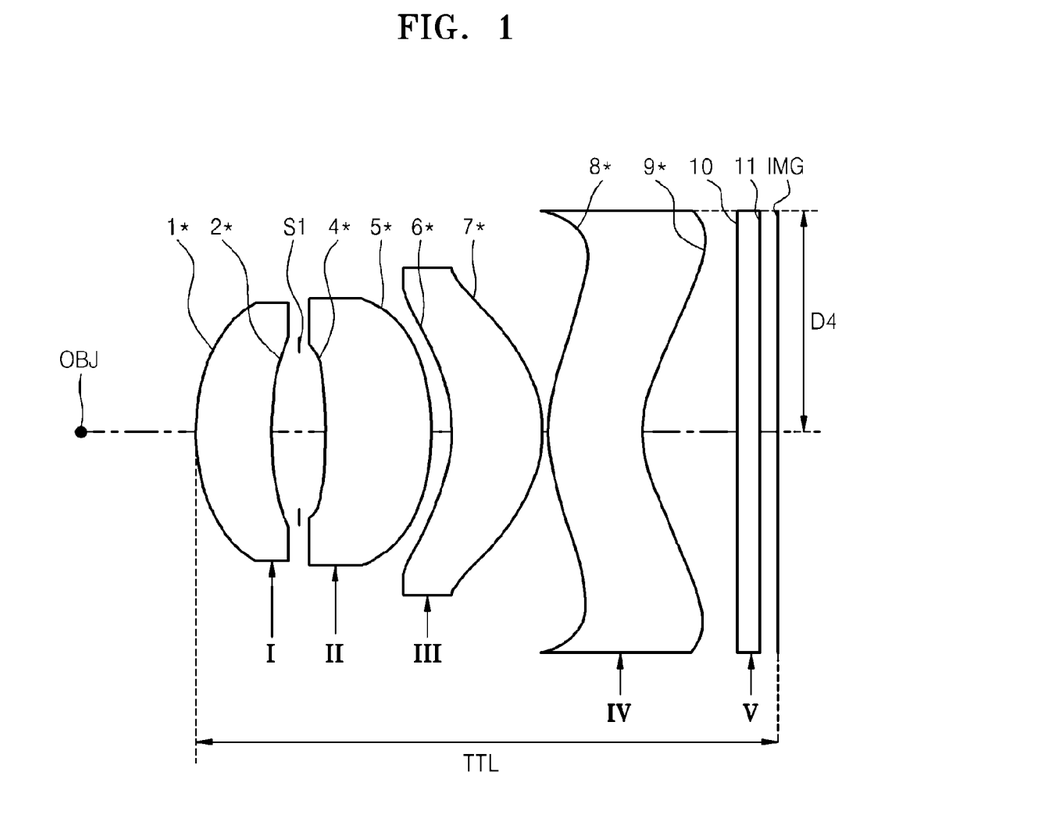
FIGS. 1 through 3 are cross-sectional views illustrating an arrangement of main elements of each of lens optical systems according to first through third embodiments of the present invention.
Figure 2:
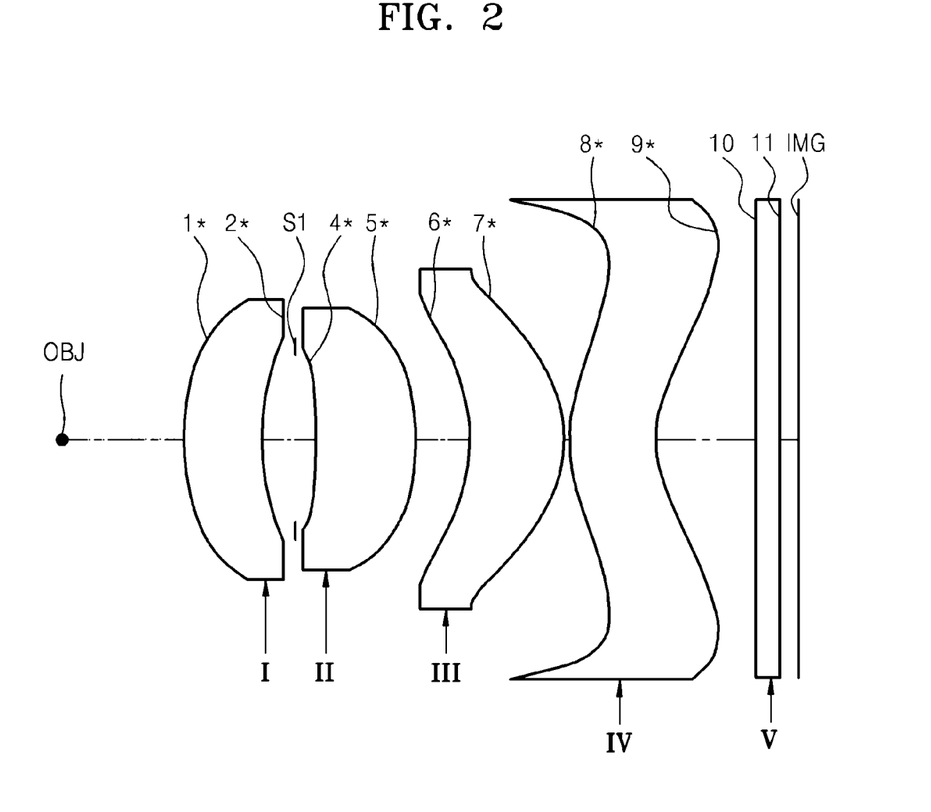
Figure 3:
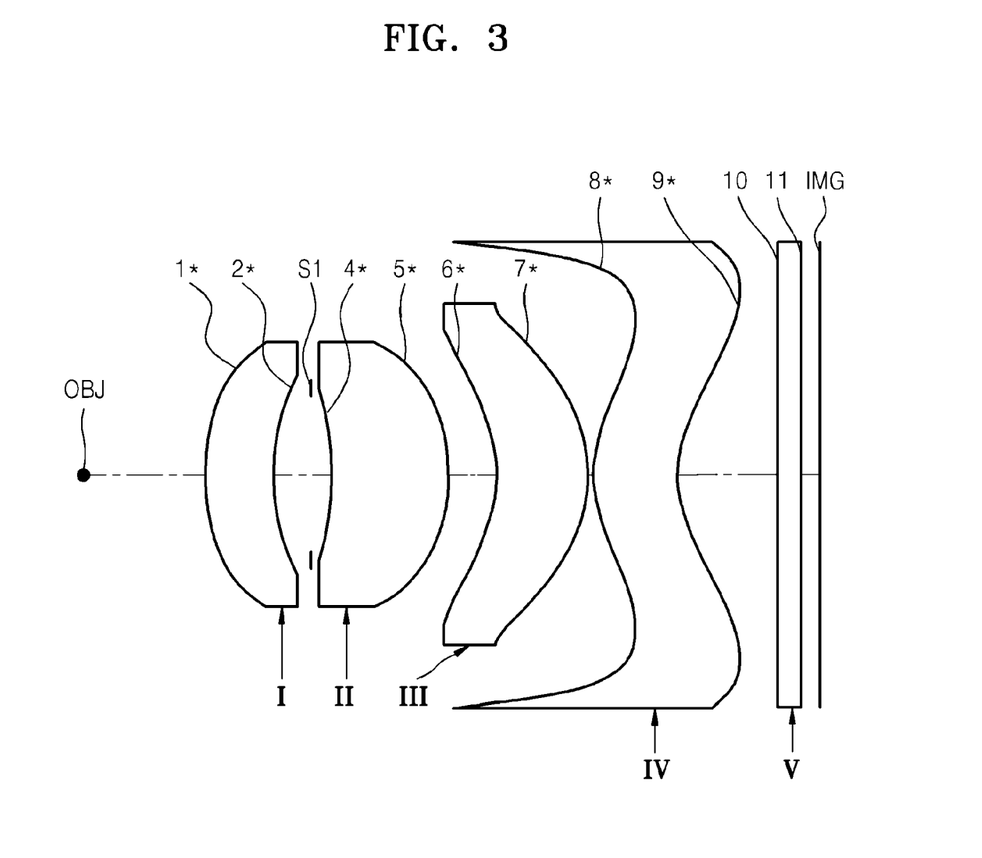

FIGS. 1 through 3 are sectional views illustrating an arrangement of main elements of lens optical systems according to first through third embodiments of the present invention. Lens optical systems according to embodiments of the present invention may be "iris recognition lens optical systems."

Referring to FIGS. 1 through 3, each of the lens optical systems according to embodiments of the present invention may include a first lens I, a second lens II, a third lens III, and a fourth lens IV that are arranged between an object OBJ and an image sensor IMG where an image of the object OBJ is formed, in order from a side of the object OBJ. The first lens I may have a positive (+) refractive power and be a meniscus lens that is convex toward the object OBJ. The second lens II may have a positive (+) refractive power and be a meniscus lens that is convex toward the image sensor IMG. The third lens III may have a positive (+) refractive power and be a meniscus lens that is convex toward the image sensor IMG. At least one of the first to third lenses I to III may be an aspherical lens. In other words, at least one of an incident surface 1*, 4*, or 6* and an exit surface 2*, 5*, or 7* of at least one of the first to third lenses I to III may be aspherical. For example, all incident surfaces 1*, 4*, and 6* and the exit surfaces 2*, 5*, and 7* of the first to third lenses I to III may be aspherical.

The fourth lens IV may have a negative (−) refractive power or a positive (+) refractive power. According to FIGS. 1 and 2, the fourth lens IV has a negative (−) refractive power, and according to FIG. 3, the fourth lens IV has a positive (+) refractive power. In the embodiments of FIGS. 1 through 3, at least one of an incident surface 8* and an exit surface 9* of the fourth lens IV may be an aspherical surface. For example, at least one of the incident surface 8* and the exit surface 9* of the fourth lens IV may be an aspherical surface having at least one inflection point between a center portion and an edge thereof. The incident surface 8* of the fourth lens IV may be convex toward the object OBJ at the center portion and concave toward the object OBJ around the center portion. The exit surface 9* of the fourth lens IV may be concave toward the image sensor IMG at the center portion and convex toward the image sensor IMG around the center portion.

The first lens I may have a relatively strong positive (+) refractive power, and the second to fourth lenses II to IV may serve as aberration correction lenses.

Each of the lens optical systems according to embodiments of the present invention may further include an aperture diaphragm S1 and a bandpass filter V. The aperture diaphragm S1 may be provided between the first lens I and the second lens II. The bandpass filter V may be provided between the fourth lens IV and the image sensor IMG. The bandpass filter V may be an infrared (IR) pass filter. The IR pass filter may pass a light (infrared ray) having a wavelength range of about 800~950 nm and block a light having the other wavelength range. The locations of the aperture diaphragm S1 and the bandpass filter V may vary. The structure or configuration of the bandpass filter V may vary.

The lens optical systems according to embodiments of the present invention configured as above may satisfy at least one of the following conditional expressions 1 to 3.

$$2.5 < |\tan \theta| < 3.5 \quad \text{[Conditional expression 1]}$$

Here, "θ" is a viewing angle of the lens optical system.

The conditional expression 1 shows conditions for determining a viewing angle of the lens optical system. In the conditional expression 1, when "|tan θ|" is less than or equal to a lower limit of 2.5, although spherical aberration and coma aberration may be decreased, a viewing angle may be decreased as well. In contrast, when the "|tan θ|" is greater than or equal to an upper limit of 3.5, although the viewing angle is increased, the spherical aberration and coma aberration may be increased. When the conditions of the expression 1 are satisfied, a relatively wide viewing angle, for example, about 70° or greater, may be obtained while maintaining the spherical aberration and coma aberration in a good state.

$$1.0 < f/D4 < 1.5 \quad \text{[Conditional expression 2]}$$

Here, "f" is a focal length of the overall lens optical system and "D4" is an effective radius of the exit surface 9* of the fourth lens IV, that is, a semi-aperture on a Y axis. Since the fourth lens IV has the largest outer diameter among the four lenses I-IV, it can be said that the outer diameter of the lens optical system is determined by the "D4".

The conditional expression 2 shows conditions for controlling the outer diameter of the lens optical system, and more particularly, the outer diameter of the exit surface 9* of the fourth lens IV. When the conditions of the expression 2 are satisfied, miniaturization (i.e., miniaturization in a vertical direction) of a lens optical system, securement of a light path, and correction of spherical aberration may be facilitated. Also, when the conditions of the expression 2 are satisfied, designing of the lens optical system can be facilitated in a way in which the outer diameter of the lens is sequentially increased from the first lens I to the fourth lens IV.

$$1.5 < TTL/f < 2.5 \quad \text{[Conditional expression 3]}$$

Here, "TTL" is a distance from the incident surface of the first lens I to the image sensor IMG and "f" is a focal length of the overall lens optical system. The "TTL" is a length on an optical axis.

The conditional expression 3 shows a condition for making a lens optical system compact (i.e., miniaturization in a horizontal direction). In the conditional expression 3, when the "TTL/f" is less than or equal to a lower limit of 1.5, although miniaturization of a lens optical system is facilitated, correction of spherical aberration may be difficult. In contrast, when the "TTL/f" is greater than or equal to an upper limit of 2.5, although correction of spherical aberration is facilitated, the total length of a lens optical system increases and thus miniaturization of the lens optical system may be difficult. Thus, setting the "TTL/f" within the above range would be advantageous for the miniaturization and the aberration correction of the lens optical system.

A lens optical system satisfying the refractive power condition, the shape requirement, and the conditional expressions 1 through 3 may be suitable to be applied to an iris recognition camera. In other words, the lens optical system may have an appropriate configuration to be applied to the iris recognition camera. In particular, the conditional expression 3 is not only related to the miniaturization of a lens optical system and the correction of aberration, but may also be an important requirement for enabling iris recognition.

In the above-described embodiments of FIGS. 1 through 3 (i.e., the first through third embodiments), the values of conditional expressions 1 through 3 are shown in Tables 1 through 3. In Table 1, the unit of the viewing angle "θ" is a degree (°). In Tables 2 and 3, the units of the "f", "D4", and "TTL" are millimeters (mm).

TABLE 1

|  | θ | tanθ | Conditional expression 1 (2.5 < \|tanθ\| < 3.5) |
|---|---|---|---|
| 1st Embodiment | 71.2 | 2.94 | satisfied |
| 2nd Embodiment | 71.5 | 2.99 | satisfied |
| 3rd Embodiment | 73.0 | 3.27 | satisfied |

TABLE 2

|  | f | D4 | f/D4 | Conditional expression 2 (1.0 < f/D4 < 1.5) |
|---|---|---|---|---|
| 1st Embodiment | 4.161 | 3.01 | 1.382 | satisfied |
| 2nd Embodiment | 4.060 | 3.08 | 1.318 | satisfied |
| 3rd Embodiment | 3.846 | 3.00 | 1.282 | satisfied |

TABLE 3

|  | TTL | f | TTL/f | Conditional expression 3 (1.5 < TTL/f < 2.5) |
|---|---|---|---|---|
| 1st Embodiment | 7.95 | 4.161 | 1.911 | satisfied |
| 2nd Embodiment | 7.95 | 4.060 | 1.958 | satisfied |
| 3rd Embodiment | 7.95 | 3.846 | 2.067 | satisfied |

Referring to Tables 1 through 3, the lens optical systems of the above embodiments of FIGS. 1 through 3 may satisfy the conditional expressions 1 through 3.

In the lens optical systems according to the above-described embodiments configured as above, the first to fourth lenses I-IV may be formed of plastic in consideration of the shapes and dimensions thereof. In other words, all of the first to fourth lenses I-IV may be plastic lenses. In case of a glass lens, a manufacturing cost is high and conditions for forming are strict, so that it may be difficult to make a compact lens optical system. In the present invention, however, since all of the first to fourth lenses I-IV may be formed of plastic, a variety of advantages according thereto may be obtained. Nevertheless, the materials of the first to fourth lenses I-IV of the present invention are not limited to plastic. If necessary, at least one of the first to fourth lenses I-IV may be formed of glass.

The lens optical systems according to the first to third embodiments of the present invention will be described in detail with reference to lens data and the accompanying drawings.

Tables 4 through 6 each shows curvature radiuses, lens thicknesses or distances between lenses, refractive indexes, and Abbe numbers of lenses constituting the lens optical systems of FIGS. 1 through 3. In Tables 4 through 6, "R" denotes a curvature radius, "D" denotes a lens thickness or a lens interval or a distance between neighboring constituent elements, "Nd" denotes a refractive index of a lens measured by using a d-line, and "Vd" denotes an Abbe number with respect to the d-line. With respect to a lens surface number, the mark * denotes that a lens surface is aspherical. The units of "R" and "D" values are millimeters (mm).

TABLE 4

| 1st Embodiment | Surface | R | D | Nd | Vd |
|---|---|---|---|---|---|
| I | 1* | 2.9800 | 1.0350 | 1.5239 | 55.8559 |
|  | 2* | 5.1249 | 0.3751 |  |  |
|  | S1 | infinity | 0.3584 |  |  |
| II | 4* | −9.5630 | 1.4531 | 1.5239 | 55.8559 |
|  | 5* | −3.1894 | 0.2818 |  |  |
| III | 6* | −1.9313 | 1.2466 | 1.5239 | 55.8559 |
|  | 7* | −1.6799 | 0.0500 |  |  |
| IV | 8* | 2.2343 | 1.2999 | 1.5239 | 55.8559 |
|  | 9* | 1.5672 | 1.3000 |  |  |
| V | 10 | infinity | 0.3000 | 1.5098 | 64.1664 |
|  | 11 | infinity | 0.2648 |  |  |
|  | IMG | infinity |  |  |  |

TABLE 5

| 2nd Embodiment | Surface | R | D | Nd | Vd |
|---|---|---|---|---|---|
| I | 1* | 3.3458 | 1.0055 | 1.5239 | 55.8559 |
|  | 2* | 4.8396 | 0.4369 |  |  |
|  | S1 | infinity | 0.2625 |  |  |
| II | 4* | −10.9795 | 1.2939 | 1.5239 | 55.8559 |
|  | 5* | −2.8645 | 0.7077 |  |  |
| III | 6* | −1.9737 | 1.2150 | 1.5239 | 55.8559 |
|  | 7* | −1.6402 | 0.0500 |  |  |
| IV | 8* | 2.0553 | 1.1284 | 1.5239 | 55.8559 |
|  | 9* | 1.4560 | 1.3000 |  |  |
| V | 10 | infinity | 0.3000 | 1.5098 | 64.1664 |
|  | 11 | infinity | 0.2431 |  |  |
|  | IMG | infinity |  |  |  |

TABLE 6

| 3rd Embodiment | Surface | R | D | Nd | Vd |
|---|---|---|---|---|---|
| I | 1* | 3.1135 | 0.8800 | 1.5239 | 55.8559 |
|  | 2* | 3.9866 | 0.4944 |  |  |
|  | S1 | infinity | 0.2553 |  |  |
| II | 4* | −10.5187 | 1.5216 | 1.5239 | 55.8559 |
|  | 5* | −2.2723 | 0.6275 |  |  |
| III | 6* | −1.6000 | 1.1775 | 1.5239 | 55.8559 |
|  | 7* | −1.8372 | 0.0500 |  |  |
| IV | 8* | 1.6856 | 1.0938 | 1.5239 | 55.8559 |
|  | 9* | 1.5357 | 1.3000 |  |  |
| V | 10 | infinity | 0.3000 | 1.5098 | 64.1664 |
|  | 11 | infinity | 0.2505 |  |  |
|  | IMG | infinity |  |  |  |

The focal length "f" and viewing angle "θ" of each lens optical system according to the first through third embodiments corresponding to FIGS. 1 through 3 are shown in Table 7.

TABLE 7

| | Focal length (f) [mm] | Viewing angle (θ) [°] |
|---|---|---|
| 1st Embodiment | 4.161 | 71.2 |
| 2nd Embodiment | 4.060 | 71.5 |
| 3rd Embodiment | 3.846 | 73.0 |

Tables 8 through 10 each shows aspherical surface coefficients of aspherical surfaces of the lens optical systems according to the first through third embodiments corresponding to FIGS. 1 through 3. In other words, Tables 8 through 10 each show aspherical coefficients of the incident surfaces 1*, 4*, 6*, and 8* and the exit surfaces 2*, 5*, 7*, and 9* of each lens of Tables 4 through 6.

TABLE 8

| Surface | K | A | B | C | D | E |
|---|---|---|---|---|---|---|
| 1* | 0.4481 | 0.0085 | −0.0005 | 0.0024 | −0.0007 | 0.0002 |
| 2* | −12.8393 | 0.0294 | 0.0005 | 0.0021 | −0.0017 | −1.3402e−005 |
| 4* | 59.7939 | −0.0186 | −0.0220 | 0.0181 | −0.0105 | −0.0005 |
| 5* | 1.9119 | 0.0127 | −0.0127 | 0.0026 | −0.0003 | 6.2702e−008 |
| 6* | −6.3193 | −0.0139 | −0.0050 | 0.0010 | 0.0005 | −7.8578e−005 |
| 7* | −1.1621 | 0.0009 | −0.0023 | 0.0005 | −2.2944e−005 | 9.4827e−006 |
| 8* | −3.1557 | −0.0210 | 0.0036 | −0.0006 | 5.5940e−005 | −3.5003e−006 |
| 9* | −3.5085 | −0.0060 | −0.0011 | 0.0004 | −57691e−005 | 2.1940e−006 |

TABLE 9

| Surface | K | A | B | C | D | E |
|---|---|---|---|---|---|---|
| 1* | 0.6112 | 0.0106 | −0.0009 | 0.0025 | −0.0008 | 0.0002 |
| 2* | −1.5761 | 0.0313 | −0.0097 | 0.0156 | −0.0058 | −1.3402e−005 |
| 4* | 79.0643 | −0.0169 | −0.0120 | 0.0079 | −0.0060 | −0.0005 |
| 5* | 1.6996 | 0.0021 | −0.0073 | 0.0024 | −0.0005 | 6.2702e−008 |
| 6* | −5.7690 | −0.0185 | −0.0043 | 0.0013 | 0.0005 | −8.7272e−005 |
| 7* | −1.2499 | 0.0011 | −0.0030 | 0.0004 | −1.5703e−005 | 2.0620e−005 |
| 8* | −3.0719 | −0.0190 | 0.0021 | −0.0004 | 6.3433e−005 | −5.3251e−006 |
| 9* | −3.1225 | −0.0098 | −0.0005 | 0.0003 | −5.1216e−005 | 1.9852e−006 |

TABLE 10

| Surface | K | A | B | C | D | E |
|---|---|---|---|---|---|---|
| 1* | 1.0235 | 0.0124 | −0.0004 | 0.0024 | −0.0007 | 0.0002 |
| 2* | 0.8093 | 0.0298 | −0.0046 | 0.0120 | −0.0058 | −1.3402e−005 |
| 4* | 81.0511 | −0.0212 | −0.0213 | 0.0185 | −0.0130 | −0.0005 |
| 5* | 0.6477 | 0.0145 | −0.0094 | 0.0028 | −0.0004 | 6.2702e−008 |
| 6* | −5.2324 | −0.0092 | −0.0048 | 0.0011 | 0.0004 | −6.2268e−005 |
| 7* | −1.0265 | −0.0012 | −0.0014 | 0.0005 | −0.0001 | 2.8895e−005 |
| 8* | −2.4711 | −0.0172 | −0.0008 | −0.0003 | 0.0001 | −1.3486e−005 |
| 9* | −1.6777 | −0.0254 | 0.0002 | 0.0005 | −8.5617e−005 | 3.5111e−006 |

Also, in the lens optical systems according to the first through third embodiments of the present invention, an aspherical surface of each lens satisfies the following aspherical surface equation, that is, Equation 4.

$$x = \frac{c' y^2}{1 + \sqrt{1 - (K+1)c'^2 y^2}} + Ay^4 + By^6 + Cy^8 + Dy^{10} + Ey^{12} \quad \text{[Equation 4]}$$

In Equation 4, "x" denotes a distance from the apex of a lens in a direction along an optical axis, "y" denotes a distance in a direction perpendicular to the optical axis, "c'" denotes a reciprocal number ($=1/r$) of a curvature radius at the apex of a lens, "K" denotes a conic constant, and "A", "B", "C", "D", and "E" each denote an aspherical surface coefficient.

Figure 4A:
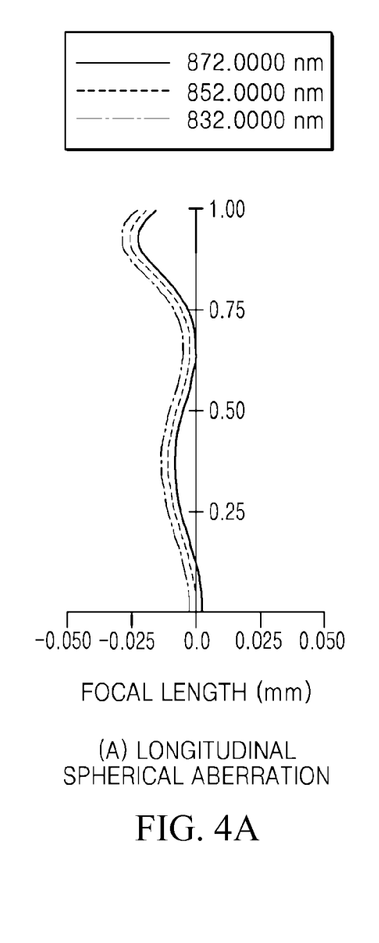
FIGS. 4A, 4B, and 4C are aberration diagrams respectively illustrating longitudinal spherical aberration, astigmatic field curvature, and distortion of the lens optical system of FIG. 1.
Figure 4B:
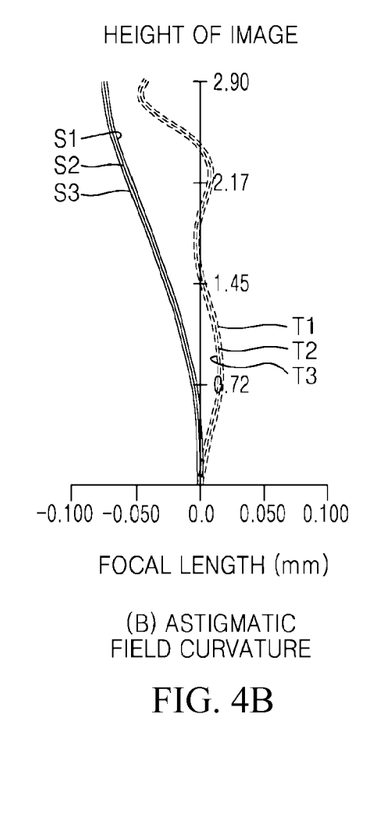
Figure 4C:
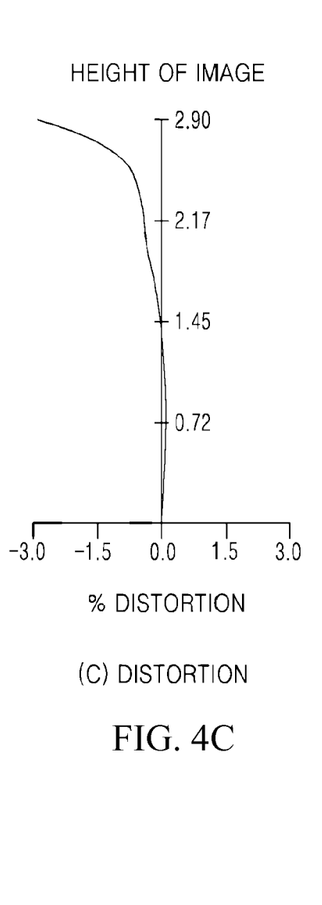

FIGS. 4A, 4B, and 4C are aberration diagrams respectively illustrating longitudinal spherical aberration, astigmatic field curvature, and distortion of the lens optical system of FIG. 1, that is, the lens optical system having the values of Table 4.

FIG. 4A illustrates spherical aberration of the lens optical system with respect to lights of various wavelengths. FIG. 4B illustrates astigmatic field curvature of the lens optical system, that is, a tangential field curvature T1 to T3 and a sagittal field curvature S1 to S3. The wavelengths of light used to obtain data of FIG. 4A are 872.0000 nm, 852.0000 nm, and 832.0000 nm. The wavelength of light used to obtain T1 and S1 of data of FIG. 4B is 872.0000 nm, the wavelength of light used to obtain T2 and S2 of data of FIG. 4B is 852.0000 nm, and the wavelength of light used to obtain T3 and S3 of data of FIG. 4B is 832.0000 nm. The wavelength of light used to obtain data of FIG. 4C is 852.0000 nm. The same conditions are applied to the lens optical systems of FIGS. 5 and 6.

Figures 5A, 5B:
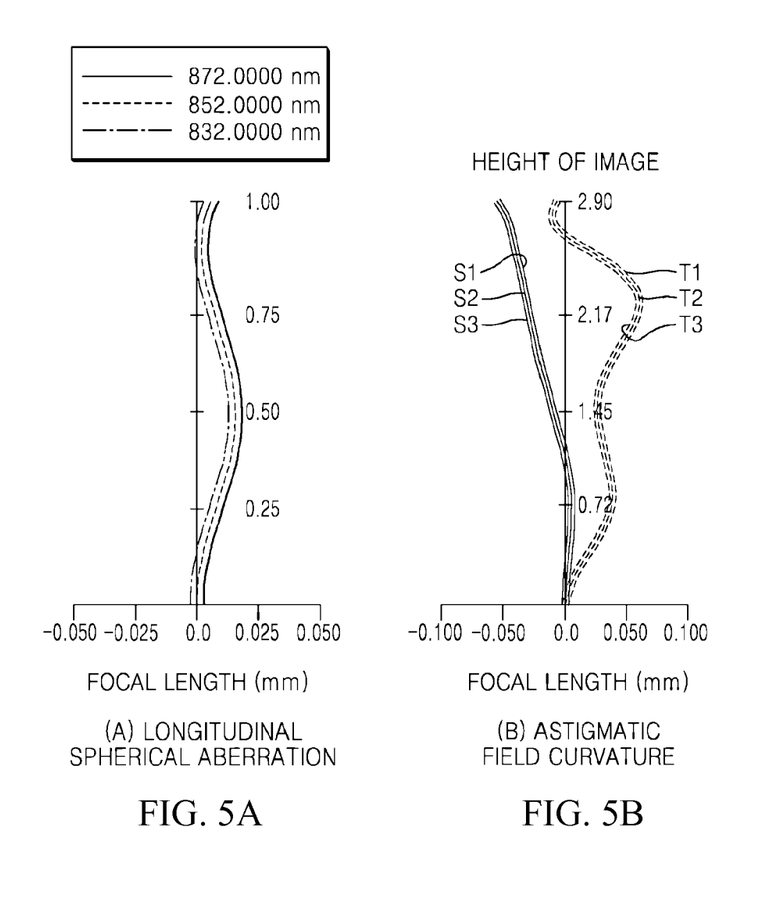
FIGS. 5A, 5B, and 5C are aberration diagrams respectively illustrating longitudinal spherical aberration, astigmatic field curvature, and distortion of the lens optical system of FIG. 2.
Figure 5C:
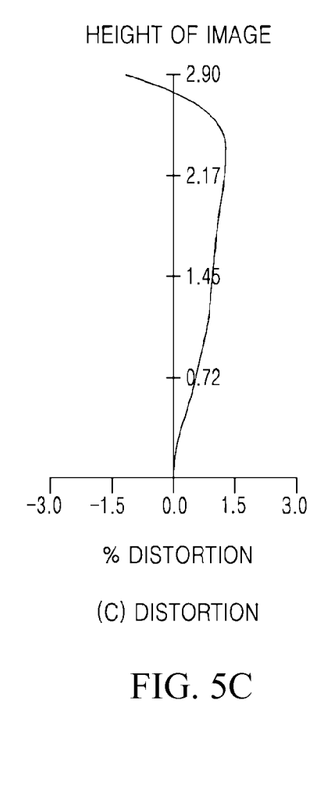

FIGS. 5A, 5B, and 5C are aberration diagrams respectively illustrating longitudinal spherical aberration, astigmatic field curvature, and distortion of the lens optical system of FIG. 2, that is, the lens optical system having the values of Table 5.

Figure 6A:
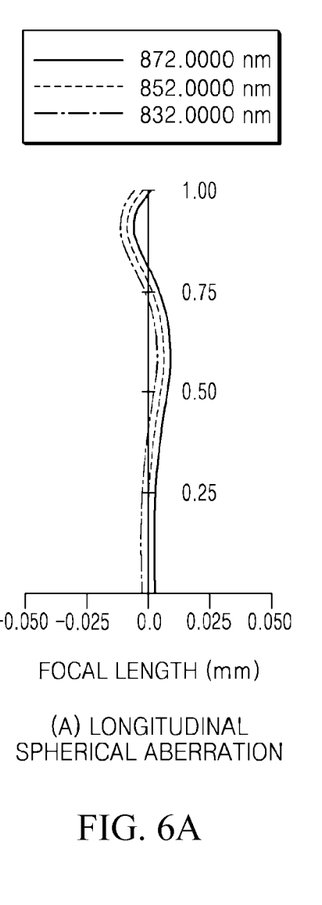
FIGS. 6A, 6B, and 6C are aberration diagrams respectively illustrating longitudinal spherical aberration, astigmatic field curvature, and distortion of the lens optical system of FIG. 3.
Figure 6B:
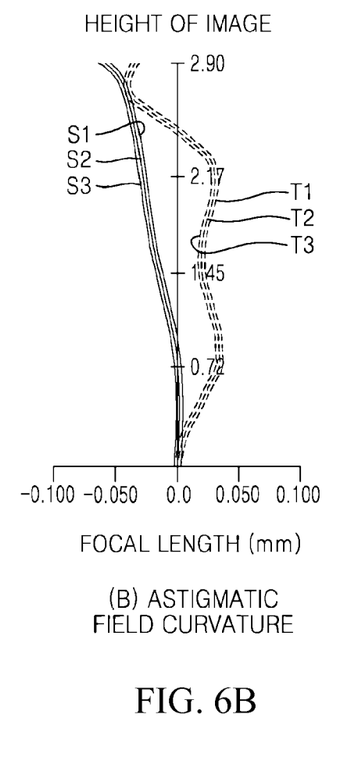
Figure 6C:
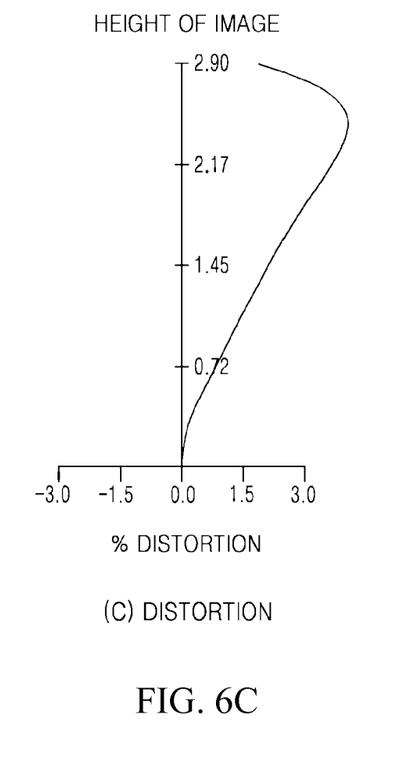

FIGS. 6A, 6B, and 6C are aberration diagrams respectively illustrating longitudinal spherical aberration, astigmatic field curvature, and distortion of the lens optical system of FIG. 3, that is, the lens optical system having the values of Table 6.

As described above, the lens optical systems (the iris recognition lens optical systems) according to the embodiments of the present invention each may include the first to fourth lenses I-IV respectively having positive (+), positive (+), positive (+), and negative (−) refractive powers or respectively having positive (+), positive (+), positive (+), and positive (+) refractive powers that are arranged in order from the object OBJ side toward the image sensor IMG side, and may satisfy at least one of the conditional expressions 1 to 3. The lens optical system having four lenses may have a relatively short total length and a small effective outer diameter. Also, the lens optical system may have a relatively large viewing angle of about 70° or more, and may easily correct various aberrations. Thus, according to the present invention, a lens optical system that is compact and lightweight and has a wide viewing angle and high resolution may be embodied. Furthermore, as described above, since the first to fourth lenses I-IV may be formed of plastic and at least one of two surfaces, that is, an incident surface and an exit surface, of each lens may be formed as an aspherical surface, a compact lens optical system with superior performance may be embodied at a low cost compared to a case of using a glass lens.

While the invention has been particularly shown and described with reference to exemplary embodiments thereof, it will be understood by those skilled in the art that various changes in form and details may be made therein without departing from the spirit and scope of the invention as defined by the appended claims. For example, it can be seen that those skilled in the art may easily obtain the above-described effect when at least one of the conditional expressions 1 through 3 are satisfied even if the shapes of the lenses in the lens optical system according to the embodiments of the present invention are slightly modified. In addition, it can be seen that other filters or a blocking film may be used instead of the IR pass filter for the bandpass filter V. Furthermore, it can be seen that the lens optical systems according to the embodiments of the present invention may be applied to various types of cameras including an iris recognition camera. Therefore, the scope of the invention is defined not by the detailed description of the invention but by the appended claims.

What is claimed is:

1. A lens optical system comprising first, second, third, and fourth lenses that are arranged between an object and an image sensor where an image of the object is formed, in order from an object side,
wherein the first lens has a positive (+) refractive power and a meniscus shape that is convex toward the object, the second lens has a positive (+) refractive power and a meniscus shape that is convex toward the image sensor, the third lens has a positive (+) refractive power and a meniscus shape that is convex toward the image sensor, and at least one of an incident surface and an exit surface of the fourth lens is an aspherical surface,
wherein the lens optical system satisfies the following conditional expression, $2.5 < |\tan \theta| < 3.5$, wherein θ is a viewing angle of the lens optical system.

2. The lens optical system of claim 1, wherein a focal length f of the lens optical system and an effective radius D4 of the exit surface of the fourth lens satisfy the following conditional expression, $1.0 < f/D4 < 1.5$.

3. The lens optical system of claim 1, wherein a distance TTL from the incident surface of the first lens to the image sensor, and a focal length f of the lens optical system satisfy the following conditional expression, $1.5 < TTL/f < 2.5$.

4. The lens optical system of claim 1, wherein the fourth lens has a negative (−) refractive power.

5. The lens optical system of claim 1, wherein the fourth lens has a positive (+) refractive power.

6. The lens optical system of claim 1, wherein at least one of the first to third lenses is an aspherical lens.

7. The lens optical system of claim 1, wherein at least one of an incident surface and an exit surface of the fourth lens has at least one inflection point between a center portion and an edge thereof.

8. The lens optical system of claim 7, wherein the incident surface of the fourth lens is convex toward the object at the center portion and concave toward the object around the center portion, and the exit surface of the fourth lens is concave toward the image sensor at the center portion and convex toward the image sensor around the center portion.

9. The lens optical system of claim 1, wherein the second, third, and fourth lenses are aberration correction lenses.

10. The lens optical system of claim 1, further comprising an aperture diaphragm between the first lens and the second lens.

11. The lens optical system of claim 1, further comprising a bandpass filter between the fourth lens and the image sensor.

12. The lens optical system of claim 11, wherein the bandpass filter is an IR pass filter.

13. The lens optical system of claim 1, wherein at least one of the first to fourth lenses is a plastic lens.

14. The lens optical system of claim 1, wherein the lens optical system is an iris recognition lens optical system.

15. A lens optical system comprising first, second, third, and fourth lenses that are arranged between an object and an image sensor where an image of the object is formed, in order from an object side,
wherein the first, second, and third lenses have all positive (+) refractive powers, and
wherein the lens optical system satisfies the following conditional expression, $2.5 < |\tan \theta| < 3.5$, and $1.0 < f/D4 < 1.5$, wherein θ is a viewing angle of the lens optical system, f is a focal length of the lens optical system, and D4 is an effective radius of the exit surface of the fourth lens.

16. The lens optical system of claim 15, wherein a distance TTL from the incident surface of the first lens to the image sensor, and a focal length f of the lens optical system satisfy the following conditional expression, $1.5 < TTL/f < 2.5$.

17. The lens optical system of claim 15, wherein the fourth lens has a negative (−) refractive power or a positive (+) refractive power.

18. The lens optical system of claim 15, wherein the first lens is a meniscus lens that is convex toward the object, the second lens is a meniscus lens that is convex toward the image sensor, the third lens is a meniscus lens that is convex toward the image sensor, and the fourth lens is an aspherical lens.

* * * * *